C. MOORE.
FISHING TOOL.
APPLICATION FILED SEPT. 29, 1913.
1,152,335.
Patented Aug. 31, 1915.
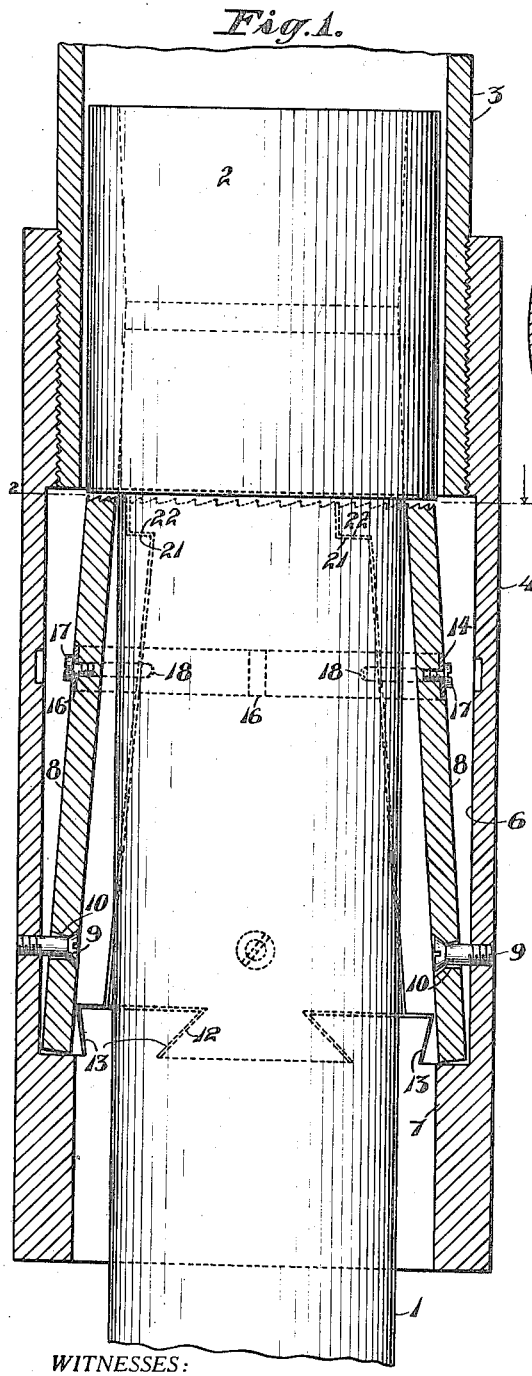
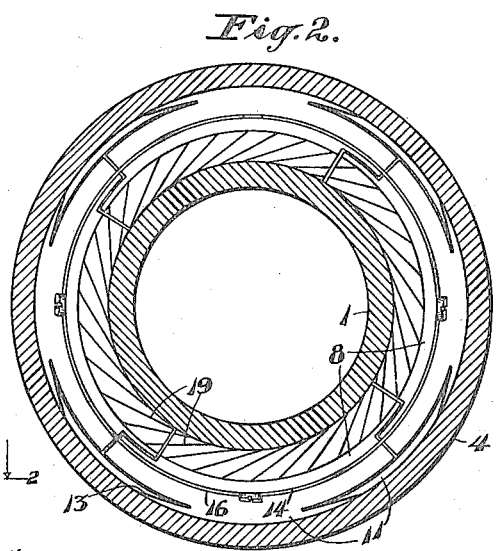
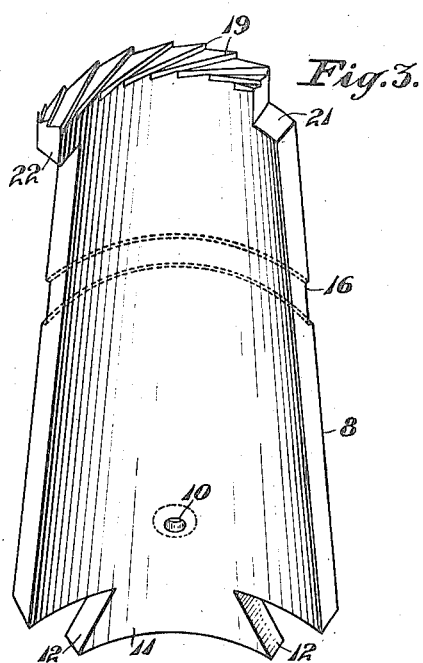
WITNESSES:
H. C. Fliedner
G. M. Ball.
INVENTOR,
Claude Moore,
BY Francis M. Wright,
ATTORNEY

UNITED STATES PATENT OFFICE.

CLAUDE MOORE, OF TAFT, CALIFORNIA.

FISHING-TOOL.

1,152,335.      Specification of Letters Patent.      Patented Aug. 31, 1915.

Application filed September 29, 1913. Serial No. 792,349.

*To all whom it may concern:*

Be it known that I, CLAUDE MOORE, a citizen of the United States, residing at Taft, in the county of Kern and State of California, have invented new and useful Improvements in Fishing-Tools, of which the following is a specification.

To recover lost pipes or other objects in deep wells there are commonly used fishing tools, and of these the most common are what are known as "over-shot" fishing tools, that is, tools which pass over and entirely surround a string of pipe and the collars thereon and which can engage all of said collars successively as the fishing tool descends. However, so far as I am aware, no over-shot fishing tools has been provided, which, after it has been in position to engage a collar, can then be released or detached therefrom and drawn upward from the string of pipe. There is great necessity for such a contrivance, because otherwise the fishing tool has often to be recovered either by pulling the pipe asunder or by breaking the fishing tool.

It is the object of my present invention to provide an over-shot fishing tool which can thus be detached.

In the accompanying drawing, Figure 1 is a side view of a portion of a pipe to which my invention is applied, the fishing tool itself being shown in vertical section; Fig. 2 is a cross section on the line 2—2 of Fig. 1; Fig. 3 is a perspective view of one of the lugs of the fishing tool.

Referring to the drawing, 1 indicates an ordinary deep well pipe, and 2 a collar therefor, which is here shown as the uppermost, although it might be intermediate of a string of pipes. 3 indicates a tube of diameter sufficiently large to surround the collar 2, and around the lower end of the tube 3 is screwed the upper end of a tubular lug carrier 4. Below the upper threaded portion 5 of said lug carrier, which is screwed to the lower end of the tube 3, said lug carrier is internally enlarged in diameter, as shown at 6, and the lowermost portion 7 of the lug carrier 4 is internally reduced in diameter. There is thus formed in the mediate portion of the lug carrier a receptacle for lugs 8, of which there may be any number, though there are here shown four. These lugs are so shaped that, in their innermost position, as shown in Fig. 1, they form a frusto-conical shell. Each lug is permanently, although loosely, attached to the carrier by a screw 9, which is passed outward through a hole 10 in the lug, and screwed into the carrier, the hole 10 being of such form as to permit a limited movement to and from the lug carrier. The bottom of each lug is formed with a downward extension 11 having outwardly flaring or undercut edges 12, said extensions fitting in similarly shaped recesses 13 in the inwardly enlarged lower portion 7 of the lug carrier. Thus, as the fishing tool descends, and passes over each carrier in succession, said lugs contacting with the outer surface of the collars are moved into the recessed mediate portion of the lug carrier. As soon as the lug carrier has descended to such a level that the lugs pass the lower edge of the collar, said lugs are pressed inward by a circular stretched split steel spring 14, which is contained in registering grooves 16 in the lugs, and is movably attached to said lugs by screws 17 passing through slots 18 in the spring, and which therefore permit circumferential movement of the spring. Since said spring is always under tension, it immediately contracts, when the lugs pass the lower edge of the collar, thereby pressing said lugs inwardly, so that their upper ends are in contact with the pipe below the collar. When said lugs have been passed below any collar of a string of pipes, and the fishing tool is then raised, the upper ends of the lugs engage the lower edge of the collar, and the string of pipes can generally be raised thereby.

Now my invention consists in the means which I employ for separating the fishing tool from the string of pipe whenever it is desired to do so, as, for instance, if it is found impossible to withdraw the string of pipes. With this object I form threads 19 upon the upper end of each lug, which threads make a very acute angle with the general direction of said edge, the inner side of each thread sloping very much more abruptly than the outer side. In order to detach the fishing tool from the collar, the tube 3, and therefore also the fishing tool, is rotated in the direction toward which the threads slope outward, which is here shown as a right-handed direction, but may also be left-handed. Since the outward directions of said threads make an acute angle with their direction of rotation, the result is that the friction against the lower edge of the collar causes said lugs to move outwardly, until eventually the upper edges of the lugs escape outward beyond the surface of the collar, and the fishing tool is easily pulled upward until it arrives at the next succeeding collar, if there be one, when the operation is repeated.

In order to prevent a rocking movement of the lugs about a horizontal axis passing through the axis of the pipe, I form each lug with a recess 21 at one end of its upper edge and a projection 22 at the other end thereof, which projection, when the lugs are in their innermost position, is adapted, as shown in dotted lines in Fig. 1, to fit snugly into the recess 21 of an adjacent lug.

I claim:—

1. An over-shot fishing tool for pipes, having a lug arranged to pass a lateral projection on the pipe to engage the under side of the same, said engaging portion having oblique grooves, to produce lateral motion of said lug when rotary motion is imparted thereto while in such engagement.

2. A fishing tool for pipes, comprising a lug carrier, lugs movably supported thereby, and arranged to pass below, and engage the under side of a projection in the pipe, the upper ends of said lugs having oblique grooves to cause the lugs to move outward while in engagement with said under side, when rotation is imparted to the lugs.

3. A fishing tool for pipes, comprising a tube arranged to pass the projections on the pipes, a mediate portion of said tube being recessed internally, lugs movably received in said recess and secured to the tube, the lower ends of said lugs having depending extensions fitting in recesses in the lower portion of the tube below said intermediate recess, and the upper ends of said lugs having oblique grooves to produce an outward movement of the lugs from a rotary movement of the tube, when said lugs are in engagement with the under side of said projection.

4. A fishing tool for pipes, comprising a tube arranged to pass the projections on the pipes, a mediate portion of said tube being recessed internally, lugs movably received in said recess and secured to the tube, the lower ends of said lugs having depending extensions fitting in recesses in the lower portion of the tube below said intermediate recess, and the upper ends of said lugs having oblique grooves to produce an outward movement of the lugs from a rotary movement of the tube, when said lugs are in engagement with the under side of said projection, and resilient means for moving inwardly the upper parts of said lugs.

5. A fishing tool for pipes, comprising a tube arranged to pass the projections on the pipes, a mediate portion of said tube being recessed internally, lugs movably received in said recess and secured to the tube, the lower ends of said lugs having depending extensions fitting in recess in the lower portion of the tube below said intermediate recess, the upper parts of said lugs having means coengaging one another to maintain the lugs in their normal position, and the upper ends of said lugs having means constructed to produce an outward movement of the lugs from a rotary movement of the tube, when said lugs are in engagement with the under side of said projection.

In testimony whereof I have hereunto set my hand in the presence of two subscribing witnesses.

CLAUDE MOORE.

Witnesses:
FRANCIS M. WRIGHT,
D. B. RICHARDS.